US009738978B2

(12) United States Patent
Suzuki et al.

(10) Patent No.: US 9,738,978 B2
(45) Date of Patent: Aug. 22, 2017

(54) METHOD OF MANUFACTURING A STEEL SHEET FOR CONTAINERS

(71) Applicant: JFE Steel Corporation, Tokyo (JP)

(72) Inventors: Takeshi Suzuki, Chiba (JP); Norihiko Nakamura, Chiba (JP); Yuka Miyamoto, Kanagawa (JP); Yoichi Tobiyama, Okayama (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/181,798

(22) Filed: Jun. 14, 2016

(65) Prior Publication Data

US 2016/0289841 A1 Oct. 6, 2016

Related U.S. Application Data

(63) Continuation of application No. 13/823,366, filed as application No. PCT/JP2011/070980 on Sep. 14, 2011, now abandoned.

(30) Foreign Application Priority Data

Sep. 15, 2010 (JP) .................. 2010-207347

(51) Int. Cl.
| | | |
|---|---|---|
| *C23C 22/83* | (2006.01) | |
| *C23C 22/73* | (2006.01) | |
| *C23C 22/78* | (2006.01) | |
| *C23C 22/82* | (2006.01) | |
| *C23C 10/28* | (2006.01) | |
| *C23C 22/34* | (2006.01) | |
| *C23C 28/00* | (2006.01) | |
| *C21D 8/02* | (2006.01) | |
| *C21D 9/46* | (2006.01) | |
| *C25D 5/12* | (2006.01) | |
| *C25D 5/36* | (2006.01) | |
| *C25D 5/50* | (2006.01) | |
| *C25D 11/34* | (2006.01) | |
| *C23C 22/07* | (2006.01) | |
| *C23C 22/00* | (2006.01) | |
| *C23C 22/36* | (2006.01) | |

(Continued)

(52) U.S. Cl.
CPC .............. *C23C 22/83* (2013.01); *B32B 1/08* (2013.01); *B32B 15/09* (2013.01); *B32B 15/18* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C23C 10/28* (2013.01); *C23C 22/00* (2013.01); *C23C 22/05* (2013.01); *C23C 22/07* (2013.01); *C23C 22/34* (2013.01); *C23C 22/36* (2013.01); *C23C 22/361* (2013.01); *C23C 22/62* (2013.01); *C23C 22/73* (2013.01); *C23C 22/77* (2013.01); *C23C 22/78* (2013.01); *C23C 22/82* (2013.01); *C23C 28/00* (2013.01); *C23C 28/321* (2013.01); *C23C 28/322* (2013.01); *C23C 28/325* (2013.01); *C23C 28/34* (2013.01); *C23C 28/3455* (2013.01); *C25D 5/12* (2013.01); *C25D 5/36* (2013.01); *C25D 5/48* (2013.01); *C25D 5/505* (2013.01); *C25D 11/34* (2013.01); *B32B 2250/03* (2013.01); *B32B 2250/40* (2013.01); *B32B 2255/06* (2013.01); *B32B 2255/205* (2013.01); *B32B 2255/26* (2013.01); *B32B 2255/28* (2013.01); *B32B 2439/66* (2013.01); *Y10T 428/12569* (2015.01)

(58) Field of Classification Search
CPC ........... B32B 15/09; B32B 1/08; B32B 15/18; B32B 15/08; B32B 2250/03; B32B 2250/40; B32B 2255/06; B32B 2255/205; B32B 2255/26; B32B 2255/28; B32B 2439/66; B32B 2250/04; B32B 15/013; B32B 15/04; C23C 22/361; C23C 22/83; C23C 28/00; C23C 22/82; C23C 22/77; C23C 10/28; C23C 10/60; C23C 28/321; C23C 28/322; C23C 28/34; C23C 28/325; C23C 28/3455; C23C 22/73; C23C 22/34; C23C 22/78; C23C 22/00; C23C 22/36; C23C 22/07; C23C 22/05; C23C 22/62; Y10T 428/12569; Y10T 428/12722; Y10T 428/12944; Y10T 428/12972

See application file for complete search history.

(56) References Cited

U.S. PATENT DOCUMENTS

2010/0203355 A1 8/2010 Kadowaki et al.

FOREIGN PATENT DOCUMENTS

| CN | 101410553 | 4/2009 |
|---|---|---|
| EP | 2006416 | 12/2008 |

(Continued)

OTHER PUBLICATIONS

International Search Report PCT/JP2011/070980 dated Dec. 20, 2011, with English translation.

(Continued)

*Primary Examiner* — Michael E La Villa
(74) *Attorney, Agent, or Firm* — Young & Thompson

(57) ABSTRACT

A manufacturing method for steel sheets for containers produces steel sheets with excellent film adhesion qualities. This steel sheet for containers has, on a steel sheet, a chemical conversion coating with a metal Zr content of 1-100 mg/m², a P content of 0.1-50 mg/m², and an F content of no more than 0.1 mg/m², upon which is formed a phenolic resin layer with a C content of 0.1-50 mg/m². Moreover, the manufacturing method for steel sheets for containers is a method for obtaining the steel sheet for containers wherein the chemical conversion coating is formed on the steel sheet by subjecting the steel sheet to immersion in or electrolytic treatment with a treatment solution containing Zr ions, phosphoric acid ions, and F ions; and subsequently, the steel sheet upon which the chemical conversion coating has been formed is immersed in, or undergoes topical application of, an aqueous solution containing phenolic resin, then dried.

4 Claims, No Drawings

(51) Int. Cl.
    *C23C 22/62*     (2006.01)
    *C23C 22/05*     (2006.01)
    *B32B 1/08*     (2006.01)
    *B32B 15/09*     (2006.01)
    *B32B 15/18*     (2006.01)
    *C25D 5/48*     (2006.01)
    *C23C 22/77*     (2006.01)

(56) References Cited

FOREIGN PATENT DOCUMENTS

| | | |
|---|---|---|
| JP | 2001-121648 | 5/2001 |
| JP | 2004-307923 | 11/2004 |
| JP | 2008-183523 | 8/2008 |
| JP | 2009-068108 | 4/2009 |
| JP | 2009-179848 | 8/2009 |
| JP | 2010-013728 | 1/2010 |
| WO | WO 2007/111354 | 10/2007 |
| WO | 2009-025390 | 2/2009 |

OTHER PUBLICATIONS

Chinese Office Action dated Apr. 3, 2014 in corresponding Chinese Patent Application No. 201180044061.2 with partial English translation of Chinese Office Action.
CN Office Action, dated Jul. 10, 2015; Application No. 201180044061.2.
Vietnamese Office Action dated Oct. 26, 2015, with English Translation; Application No. 1-2013-00807.

METHOD OF MANUFACTURING A STEEL SHEET FOR CONTAINERS

TECHNICAL FIELD

The present invention relates to a steel sheet for containers and a method of manufacturing the same.

BACKGROUND ART

In any type of can, steel sheets for use in cans (steel sheets for containers) have conventionally been coated but in recent years a film lamination technique has drawn attention as a technique to replace coating and has spread rapidly from the viewpoint of global environmental protection.

A chromate coating has conventionally been formed on a steel sheet for use in the undercoat of a laminated film but recently there have started to be calls for restrictions to be imposed on the use of hazardous substances such as lead and cadmium and for attention to be paid to the working environment of manufacturing plants and there have been requests to stop the use of a chromate coating.

In the beverage container market, cans face competition from containers such as PET bottles, bottles and drink boxes in terms of cost and quality, and steel sheets for laminated containers are also required to have more excellent formability in can manufacture (in particular, in terms of film adhesion, formed film adhesion, corrosion resistance).

For example, Patent Literature 1 discloses, as a steel sheet meeting such requirements, a steel sheet for containers having a zirconium compound coating formed on the steel sheet by subjecting the steel sheet to immersion or electrolytic treatment in a solution containing zirconium ions, fluorine ions, ammonium ions and nitrate ions, the coating weight of the zirconium compound coating being 1 to 100 mg/m$^2$ in terms of zirconium metal content and up to 0.1 mg/m$^2$ in terms of fluorine content ([Claim 1]).

CITATION LIST

Patent Literature

Patent Literature 1: JP 2010-13728 A

SUMMARY OF INVENTION

Technical Problems

As described above, competition in terms of quality has been increasing recently in the beverage container market and steel sheets for laminated containers are also required to have more excellent film adhesion. In particular, the film in the neck portion of a can formed after necking is generally prone to coming off and therefore a steel sheet for containers in which delamination does not occur in the neck portion even under severe conditions has been desired.

The inventors of the invention have conducted studies on film adhesion in the neck portion (hereinafter also referred to as "high film adhesion") using the steel sheet for containers as disclosed in Patent Literature 1 and found that the film adhesion does not reach the level now required and an improvement is necessary.

Accordingly, the present invention aims to provide a steel sheet for containers which is excellent in terms of high film adhesion and aims to provide a method of manufacturing the same.

Solution to Problems

The inventors of the invention carried out intensive studies to solve the above-described problems and as a result found that a steel sheet for containers obtained by forming a specified chemical conversion coating on a steel sheet and forming a specified phenolic resin layer on the chemical conversion coating is excellent in terms of high film adhesion and the invention has been thus completed.

Specifically, the invention provides the following (1) to (7).

(1) A steel sheet for containers, having a chemical conversion coating formed on the steel sheet and containing 1 to 100 mg/m$^2$ of zirconium metal, 0.1 to 50 mg/m$^2$ of phosphorus and up to 0.1 mg/m$^2$ of fluorine; and a phenolic resin layer formed on the chemical conversion coating and containing 0.1 to 50 mg/m$^2$ of carbon.

(2) The steel sheet for containers according to (1) above, wherein the steel sheet for containers is obtained by forming the chemical conversion coating on the steel sheet by subjecting the steel sheet to immersion in a treatment solution containing zirconium ions, phosphate ions and fluorine ions or to electrolytic treatment using the treatment solution; then immersing the steel sheet having the chemical conversion coating formed thereon in an aqueous solution containing a phenolic resin or applying the aqueous solution onto the chemical conversion coating; and then drying the steel sheet.

(3) The steel sheet for containers according to (1) or (2) above, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

(4) The steel sheet for containers according to (1) or (2) above, wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands, wherein the nickel undercoat layer contains 5 to 150 mg/m$^2$ of nickel in terms of nickel metal amount, and wherein the tin-plating layer contains 300 to 3,000 mg/m$^2$ of tin in terms of tin metal amount.

(5) A method of manufacturing a steel sheet for containers for obtaining the steel sheet for containers according to any one of (1) to (4) above, comprising: forming the chemical conversion coating on the steel sheet by subjecting the steel sheet to immersion in a treatment solution containing zirconium ions, phosphate ions and fluorine ions or to electrolytic treatment using the treatment solution; then immersing the steel sheet having the chemical conversion coating formed thereon in an aqueous solution containing a phenolic resin or applying the aqueous solution onto the chemical conversion coating; and then drying the steel sheet.

(6) The method of manufacturing the steel sheet for containers according to (5) above, wherein a temperature for the drying is 70° C. or more.

(7) The method of manufacturing the steel sheet for containers according to (5) or (6) above, wherein the drying is followed by washing with water at a temperature of 80° C. or more and redrying.

Advantageous Effects of Invention

The invention can provide a steel sheet for containers which is excellent in terms of high film adhesion and a method of manufacturing the same.

DESCRIPTION OF EMBODIMENTS

[Steel Sheet for Containers]

The steel sheet for containers according to the invention is a steel sheet including a chemical conversion coating formed on the steel sheet and containing 1 to 100 mg/m$^2$ of zirconium metal, 0.1 to 50 mg/m$^2$ of phosphorus and up to 0.1 mg/m$^2$ of fluorine, and a phenolic resin layer formed on the chemical conversion coating and containing 0.1 to 50 mg/m$^2$ of carbon.

The structure of the steel sheet for containers according to the invention is described below in detail.

[Steel Sheet]

A steel sheet that may be used in the invention is not particularly limited and base steel sheets for use as container materials can be generally used. There are also no particular limitations on the method of manufacturing the base steel sheets and the type of material, and use may be made of base steel sheets obtained through manufacturing steps including an ordinary billet forming step, hot rolling, pickling, cold rolling, annealing and temper rolling.

The steel sheet for use in the invention may have a surface-treatment layer formed on at least one side thereof and containing nickel (Ni) and/or tin (Sn).

Such a surface-treatment layer is, for example, a nickel-plating layer, a tin-plating layer or a tin-nickel-alloy plating layer.

Nickel affects, for example, coating adhesion, film adhesion, corrosion resistance and weldability. The nickel metal content in the surface-treatment layer is preferably from 10 to 1,000 mg/m$^2$ for the reason that these properties are more excellent when the nickel metal content is within this range and from an economic point of view.

Tin affects, for example, formability, weldability and corrosion resistance. With regard to this, the tin metal content in the surface-treatment layer is preferably from 100 to 15,000 mg/m$^2$ for the reason that these properties are more excellent when the tin metal content is within this range and from an economic point of view, preferably from 200 to 15,000 mg/m$^2$ because of more excellent weldability, and more preferably from 1,000 to 15,000 mg/m$^2$ because of more excellent formability.

The method for forming the surface-treatment layer (plating layer) is not particularly limited. For example, known methods including electroplating, immersion plating, vacuum deposition and sputtering can be used and heating treatment may also be combined to form a diffusion layer.

The nickel-plating layer may be a layer formed by nickel metal plating or an iron-nickel-alloy plating layer formed by iron (Fe)-nickel (Ni) alloy plating.

The tin-plating layer is formed by tin metal plating (tin plating) but the tin plating as used in the invention includes cases where irreversible impurities are incorporated in the tin metal and cases where trace elements are added to the tin metal.

In the practice of the invention, a tin-plating layer containing tin islands may be formed. In this case, the surface of the steel sheet is plated with nickel or an iron-nickel alloy to form a nickel undercoat layer, on which is then provided a tin-plating coating, and part of the tin-plating coating is alloyed with part or all of the nickel undercoat layer by tin melting treatment to form the tin-plating layer containing tin islands.

Tin is melted by the tin melting treatment (reflow treatment) and alloyed with the steel sheet or the nickel undercoat layer to form a tin-iron-alloy layer or a tin-iron-nickel-alloy layer, whereby the alloy layer has improved corrosion resistance and tin alloy islands are formed. The tin alloy islands can be formed by properly controlling the tin melting treatment.

Since nickel is a metal which is highly resistant to corrosion, the iron- and tin-containing alloy layer formed by the tin melting treatment can have improved corrosion resistance.

The nickel undercoat layer preferably contains 5 to 150 mg/m$^2$ of nickel metal from the viewpoint of realizing the corrosion resistance and from an economic point of view.

In cases where heating treatment is performed to form a diffusion layer as the nickel undercoat layer, nitriding treatment may be performed before or after the heating treatment or simultaneously therewith.

The excellent corrosion resistance of tin is significantly improved at a tin metal content of 300 mg/m$^2$ or more and the degree of improvement of the corrosion resistance is also increased with increasing tin content. Therefore, the tin metal content in the tin-island-containing tin-plating layer is preferably 300 mg/m$^2$ or more. In addition, the corrosion-resistance-improving effect becomes saturated at a tin metal content exceeding 3,000 mg/m$^2$ and hence the tin content is preferably up to 3,000 mg/m$^2$ from an economic point of view.

Tin, which has low electric resistance, is flexible and is spread by application of voltage between electrodes during welding to ensure a stable electric conduction area, and hence exhibits particularly excellent weldability. The excellent weldability is exhibited at a tin metal content of 100 mg/m$^2$ or more. The weldability-improving effect does not become saturated at a tin metal content within a range in which the excellent corrosion resistance as described above is exhibited. Therefore, the tin metal content is preferably at least 300 mg/m$^2$ but not more than 3,000 mg/m$^2$ in order to ensure that the steel sheet has excellent corrosion resistance and weldability.

The nickel metal content or the tin metal content in the surface-treatment layer may be measured by, for example, a fluorescent X-ray method. In this case, a nickel deposition amount sample in which the nickel metal content is known is used to specify the calibration curve for the nickel metal content in advance and the calibration curve is used to relatively specify the nickel metal content. The same applies to the tin metal content, and a tin deposition amount sample in which the tin metal content is known is used to specify the calibration curve for the tin metal content in advance and the calibration curve is used to relatively specify the tin metal content.

[Chemical Conversion Coating]

The steel sheet for containers according to the invention includes a chemical conversion coating formed on the above-described steel sheet and containing 1 to 100 mg/m$^2$ of zirconium metal, 0.1 to 50 mg/m$^2$ of phosphorus and up to 0.1 mg/m$^2$ of fluorine.

Exemplary methods for forming the chemical conversion coating include a method involving immersion treatment in which a steel sheet is immersed in a treatment solution (acidic solution) containing zirconium ions, phosphate ions and fluorine ions dissolved therein; and a method involving cathodic electrolytic treatment in a treatment solution containing zirconium ions, phosphate ions and fluorine ions. A method involving cathodic electrolytic treatment is preferable because a uniform coating can be obtained.

In addition, particularly in the cathodic electrolytic treatment, the treatment solution preferably contains both nitrate ions and ammonium ions. This makes it possible to perform the treatment in a short period of time from about a few seconds to about several tens of seconds and to form a chemical conversion coating having an excellent effect in improving the corrosion resistance and adhesion.

In cases where the cathodic electrolytic treatment is performed, the cell temperature in the cathodic electrolytic treatment is preferably from 10 to 40° C. from such viewpoints as efficiency in coating formation, cost and uniformity in the structure of the formed coating (cathodic electrolytic treatment at low temperatures). The electrolytic current density in the cathodic electrolytic treatment is preferably from 0.05 to 50 A/dm$^2$ from the viewpoint of suppression of a decrease in coating weight, stable coating formation, treatment time and suppression of a decrease in coating characteristics. In addition, the current flow time in the cathodic electrolytic treatment is preferably from 0.01 to 5 seconds from the viewpoint of suppression of decrease in coating weight, stable coating formation, treatment time and suppression of a decrease in coating characteristics.

The chemical conversion coating contains a zirconium compound. The zirconium compound serves to secure the corrosion resistance and adhesion. Examples of the zirconium compound are considered to include a zirconium hydrous oxide and a zirconium-phosphorus oxide and these zirconium compounds have excellent corrosion resistance and adhesion. "Zirconium hydrous oxide" refers to a compound formed by mixing zirconium oxide and zirconium hydroxide together.

The chemical conversion coating containing at least 1 mg/m$^2$ of zirconium metal ensures that the corrosion resistance and adhesion are at levels causing no practical problem. At a zirconium metal content in excess of 100 mg/m$^2$, the adhesion of the chemical conversion coating itself is deteriorated and the electric resistance is increased, which deteriorates the weldability. Therefore, the zirconium metal content in the chemical conversion coating is from 1 to 100 mg/m$^2$, preferably from 1 to 20 mg/m$^2$ and more preferably from 1 to 10 mg/m$^2$.

More excellent corrosion resistance and adhesion are achieved with increasing content of the zirconium-phosphorus oxide but this effect can be clearly recognized when the phosphorus content is at least 0.1 mg/m$^2$. At a phosphorus content in excess of 50 mg/m$^2$, the adhesion is deteriorated and the electric resistance is increased, which deteriorates the weldability. Therefore, the phosphorus content in the chemical conversion coating is from 0.1 to 50 mg /m$^2$, preferably from 0.1 to 20 mg/m$^2$ and more preferably from 0.1 to 10 mg/m$^2$.

Fluorine is included in the treatment solution and is hence incorporated in the coating together with the zirconium compound. Fluorine in the coating does not affect the adhesion of a coating material or a film at a general level but may deteriorate the adhesion upon performance of retort treatment or other high-temperature sterilization treatments and may deteriorate resistance to rusting or corrosion under the coated film. This is presumably because fluorine in the coating leaches out into water vapor or an etching solution and decomposes the bonds with an organic coating or corrodes the underlying steel sheet.

The fluorine content in the chemical conversion coating is up to 0.1 mg/m$^2$ because these properties obviously begin to deteriorate at a fluorine content in excess of 0.1 mg/m$^2$.

In order to adjust the fluorine content in the chemical conversion coating to 0.1 mg/m$^2$ or less, formation of the chemical conversion coating should be followed by cleaning through immersion in hot water or spraying. In this process, the fluorine content can be reduced by increasing the treatment temperature or the treatment time.

For example, the fluorine content in the chemical conversion coating can be adjusted to 0.1 mg/m$^2$ or less by immersion in hot water at 40° C. or more for at least 0.5 seconds or spraying.

The zirconium metal content, phosphorus content and fluorine content in the chemical conversion coating can be measured by, for example, a quantitative analysis method such as fluorescent X-ray analysis.

The ammonium ion concentration and the nitrate ion concentration in the treatment solution may be appropriately adjusted in accordance with the production equipment and the production rate (capacity) in ranges of about 100 to about 10,000 ppm and about 1,000 to about 20,000 ppm, respectively.

[Phenolic Resin Layer]

The steel sheet for containers according to the invention includes a phenolic resin layer formed on the chemical conversion coating and containing a phenolic resin.

The phenolic resin contains as a constituent, for example, a water-soluble phenolic resin modified with N,N-diethanolamine.

Since the phenolic resin itself is an organic substance, the steel sheet for containers of the invention, which includes the phenolic resin layer, has exceptionally good adhesion to the laminated film.

On the one hand, carbon content in the phenolic resin layer of less than 0.1 mg/m$^2$ does not ensure adhesion at a practical level. On the other hand, at a carbon content in excess of 50 mg/m$^2$, the electric resistance may be increased, which would deteriorate the weldability and cohesion failure in the phenolic resin layer may reduce the adhesion.

In contrast, a carbon content of 0.1 to 50 mg/m$^2$ ensures adhesion at a level causing no practical problem and also suppresses the increase of electric resistance. Therefore, the carbon content in the phenolic resin layer is from 0.1 to 50 mg /m$^2$, preferably from 0.1 to 10 mg/m$^2$ and more preferably from 0.1 to 8 mg/m$^2$.

The carbon content in the phenolic resin layer can be measured by subtracting the amount of carbon present in the steel sheet using a TOC (total organic carbon meter).

The method of forming the phenolic resin layer is not particularly limited and examples thereof include a method which includes immersing a steel sheet having a chemical conversion coating formed thereon in a phenolic resin-containing aqueous solution and drying; and a method which includes applying a phenolic resin-containing aqueous solution to a chemical conversion coating formed on a steel sheet and drying.

In the case of immersion, the immersion time is not particularly limited and is preferably at least 1 second.

In any of the methods, the drying temperature is preferably 70° C. or more.

[Cleaning]

In the practice of the invention, for the reason that the steel sheet for containers is more excellent in terms of high film adhesion, the steel sheet for containers as obtained after the formation of the phenolic resin layer may be washed with water and preferably water at a temperature of 80° C. or more and then dried.

It is deemed that such cleaning properly roughens the surface of the phenolic resin layer to enhance the high film adhesion.

Such cleaning is also effective in reducing the fluorine content by removing fluorine present in the chemical conversion coating.

The cleaning method is not particularly limited and examples thereof include a method in which the resulting steel sheet for containers is immersed in water; and a method in which water is sprayed or otherwise applied to the resulting steel sheet for containers.

In the case of immersion, the immersion time is preferably at least 1 second.

The drying temperature is preferably 70° C. or more.

EXAMPLES

The invention is described below more specifically by way of examples. However, the invention should not be construed as being limited to these examples.

[Surface-Treatment Layer]

The following treatment processes (1-0) to (1-7) were used to form a surface-treatment layer on each steel sheet with a sheet thickness of 0.17 to 0.23 mm.

(1-0) A base sheet subjected to annealing and pressure adjustment after cold rolling was degreased and pickled to prepare a steel sheet.

(1-1) A base sheet subjected to annealing and pressure adjustment after cold rolling was degreased, pickled and plated with a tin-nickel alloy in a sulfuric acid-hydrochloric acid bath to prepare a nickel/tin-plated steel sheet.

(1-2) A base sheet subjected to annealing and pressure adjustment after cold rolling was degreased, pickled and plated with nickel using a Watts bath to prepare a nickel-plated steel sheet.

(1-3) Cold rolling was followed by nickel plating using a Watts bath and a nickel diffusion layer was formed during annealing to prepare a nickel-plated steel sheet.

(1-4) A base sheet subjected to annealing and pressure adjustment after cold rolling was degreased, pickled and plated with tin using a Ferrostan bath to prepare a tin-plated steel sheet.

(1-5) A base sheet subjected to annealing and pressure adjustment after cold rolling was degreased, pickled, plated with tin using a Ferrostan bath and subjected to tin melting treatment (reflow treatment) to prepare a tin-plated steel sheet having a tin alloy layer.

(1-6) A base sheet after cold rolling was degreased, pickled, plated with nickel using a Watts bath, underwent formation of a nickel diffusion layer during annealing, was degreased, pickled, plated with tin using a Ferrostan bath, and then subjected to tin melting treatment to prepare a nickel/tin-plated steel sheet having a tin alloy layer.

(1-7) A base sheet subjected to annealing and pressure adjustment after cold rolling was degreased, pickled, plated with an iron-nickel alloy using a sulfuric acid-hydrochloric acid bath and subsequently plated with tin using a Ferrostan bath and then subjected to tin melting treatment (reflow treatment) to prepare a nickel/tin-plated steel sheet having a tin alloy layer.

When the treatments of (1-6) and (1-7) were performed, the surface was observed with an optical microscope and evaluated in terms of the state of the tin islands. Then, islands were confirmed to be formed over the entire surface.

[Chemical Conversion Coating]

After the surface-treatment layer was formed by the above-described treatments, a chemical conversion coating was formed by the following treatment processes (2-1) to (2-3).

(2-1) The above-described steel sheets were immersed in a treatment solution containing $K_2ZrF_6$ (4.3 g/L) and phosphoric acid (1.2 g/L) dissolved therein and adjusted to a pH of 2.65 by addition of ammonium nitrate, and subjected to cathodic electrolysis at a cell temperature of 30° C. under the conditions shown in Table 1 to form a chemical conversion coating.

(2-2) The above-described steel sheets were immersed in a treatment solution containing $K_2ZrF_6$ (4.3 g/L), phosphoric acid (1.2 g/L) and a phenolic resin (0.7 g/L) dissolved therein and adjusted to a pH of 2.65 by addition of ammonium nitrate, and subjected to cathodic electrolysis at a cell temperature of 30° C. under the conditions shown in Table 1 to form a chemical conversion coating.

(2-3) The above-described steel sheets were immersed in a treatment solution containing $K_2ZrF_6$ (4.3 g/L) and sodium phosphate (1.4 g/L) dissolved therein and adjusted to a pH of 2.65 by addition of phosphoric acid, and subjected to cathodic electrolysis at a cell temperature of 30° C. under the conditions shown in Table 1 to form a chemical conversion coating.

[Water Washing]

After the chemical conversion coating was formed by the above-described treatments, water washing was performed by the following treatment process (3-1) to control the amount of fluorine in the chemical conversion coating.

(3-1) The chemical conversion coating was immersed in hot water at 40° C. for 1 second.

[Phenolic Resin Layer]

After the chemical conversion coating was formed by the above-described treatments and washed with water by the above-described treatment, the following treatments (4-1) to (4-5) were performed to form a phenolic resin layer.

(4-1) An aqueous solution containing 0.1 g/L of phenolic resin dissolved therein was applied by a roll coater and dried at 75° C. to form a phenolic resin layer.

(4-2) The above-described steel sheets were immersed for 1 second in an aqueous solution containing 0.5 g/L of phenolic resin dissolved therein, pressed with a roll and dried at 75° C. to form a phenolic resin layer.

(4-3) An aqueous solution containing 3.0 g/L of phenolic resin dissolved therein was applied by a roll coater and dried at 75° C. to form a phenolic resin layer.

(4-4) The above-described steel sheets were immersed for 1 second in an aqueous solution containing 0.01 g/L of phenolic resin dissolved therein, pressed with a roll and dried at 75° C. to form a phenolic resin layer.

(4-5) An aqueous solution containing 10.0 g/L of phenolic resin dissolved therein was applied by a roll coater and dried at 75° C. to form a phenolic resin layer.

In each case, the above-described water-soluble phenolic resin modified with N,N-diethanolamine (weight-average molecular weight: 5,000) was used as the phenolic resin.

[Cleaning]

After the phenolic resin layer was formed by the above-described treatments, cleaning was performed by the following treatment process (5-1).

(5-1) The above-described steel sheets were immersed in water at 85° C. for 1 second and dried at 75° C.

In each of Examples and Comparative Examples, the nickel metal content and the tin metal content in the surface-treatment layer were measured by a fluorescent X-ray method and specified using calibration curves. The amounts of zirconium metal, phosphorus and fluorine contained in the chemical conversion coating were measured by a quantitative analysis method such as fluorescent X-ray analysis. The amount of carbon contained in the chemical conversion coating and the phenolic resin layer was measured by subtracting the amount of carbon present in the steel sheet using a TOC (total organic carbon meter).

[Performance Evaluation]

The samples obtained by the above-described treatments were evaluated for the high film adhesion.

First, both surfaces of the sample in each of Examples and Comparative Examples were laminated with a PET film with a thickness of 20 μm at 200° C. and the sample was subjected to drawing and ironing to prepare a can. The thus prepared can was necked to form a neck portion. The can was subjected to retort treatment at 120° C. for 30 minutes to evaluate the state of film delamination at the neck portion.

More specifically, a sample having no delamination was rated "excellent", a sample having slight delamination that does not cause a practical problem was rated "good", a sample having partial delamination that does cause a practical problem was rated "fair" and a sample in which delamination occurred over large areas thereof was rated "poor." The results are shown in Table 1.

TABLE 1

| | | Surface-treatment layer | | | Chemical conversion coating | | | | |
|---|---|---|---|---|---|---|---|---|---|
| | | Treatment | Ni content (mg/m$^2$) | Sn content (mg/m$^2$) | Treatment | Current density (A/dm$^2$) | Electrolysis time (sec) | Zr content (mg/m$^2$) | P content (mg/m$^2$) |
| EX | 1 | 1-0 | — | — | 2-1 | 55 | 2 | 80 | 16 |
| | 2 | 1-0 | — | — | 2-1 | 55 | 2 | 76 | 15 |
| | 3 | 1-1 | 80 | 450 | 2-1 | 17 | 1 | 22 | 8 |
| | 4 | 1-2 | 460 | — | 2-1 | 18 | 1 | 23 | 8 |
| | 5 | 1-3 | 930 | — | 2-1 | 24 | 2 | 41 | 11 |
| | 6 | 1-4 | — | 2600 | 2-3 | 3 | 1 | 8 | 4 |
| | 7 | 1-5 | — | 13500 | 2-3 | 2 | 1 | 6 | 3 |
| | 8 | 1-6 | 70 | 800 | 2-1 | 12 | 1 | 19 | 8 |
| | 9 | 1-7 | 40 | 1200 | 2-1 | 3 | 1 | 9 | 4 |
| CE | 1 | 1-0 | — | — | 2-1 | 55 | 2 | 78 | 16 |
| | 2 | 1-1 | 80 | 450 | 2-1 | 17 | 1 | 23 | 8 |
| | 3 | 1-2 | 460 | — | 2-1 | 18 | 1 | 24 | 8 |
| | 4 | 1-3 | 930 | — | 2-1 | 24 | 2 | 41 | 11 |
| | 5 | 1-4 | — | 2600 | 2-3 | 3 | 1 | 8 | 4 |
| | 6 | 1-5 | — | 13500 | 2-3 | 2 | 1 | 6 | 3 |
| | 7 | 1-6 | 70 | 800 | 2-1 | 12 | 1 | 20 | 8 |
| | 8 | 1-7 | 40 | 1200 | 2-1 | 3 | 1 | 9 | 4 |
| | 9 | 1-2 | 450 | — | 2-2 | 5 | 1 | 15 | 7 |
| | 10 | 1-1 | 80 | 450 | 2-1 | 17 | 1 | 22 | 8 |
| | 11 | 1-1 | 80 | 450 | 2-1 | 17 | 1 | 22 | 8 |

| | | Chemical conversion coating | | | Phenol resin layer | | | |
|---|---|---|---|---|---|---|---|---|
| | | F content (mg/m$^2$) | C content (mg/m$^2$) | Water washing | Treatment | C content (mg/m$^2$) | Cleaning | Evaluation High film adhesion |
| EX | 1 | 0.01 or less | — | 3-1 | 4-1 | 0.6 | — | Good |
| | 2 | 0.01 or less | — | 3-1 | 4-1 | 0.6 | 5-1 | Excellent to good |
| | 3 | 0.01 or less | — | 3-1 | 4-2 | 7 | — | Excellent |
| | 4 | 0.01 or less | — | 3-1 | 4-3 | 31 | — | Good |
| | 5 | 0.01 or less | — | 3-1 | 4-3 | 17 | — | Excellent |
| | 6 | 0.01 or less | — | 3-1 | 4-3 | 14 | — | Good |
| | 7 | 0.01 or less | — | 3-1 | 4-3 | 19 | — | Good |
| | 8 | 0.01 or less | — | 3-1 | 4-3 | 21 | — | Excellent |
| | 9 | 0.01 or less | — | 3-1 | 4-3 | 25 | — | Excellent |
| CE | 1 | 0.01 or less | — | 3-1 | — | — | — | Poor |
| | 2 | 0.01 or less | — | 3-1 | — | — | — | Poor |
| | 3 | 0.01 or less | — | 3-1 | — | — | — | Fair |
| | 4 | 0.01 or less | — | 3-1 | — | — | — | Fair |
| | 5 | 0.01 or less | — | 3-1 | — | — | — | Poor |
| | 6 | 0.01 or less | — | 3-1 | — | — | — | Poor |
| | 7 | 0.01 or less | — | 3-1 | — | — | — | Poor |
| | 8 | 0.01 or less | — | 3-1 | — | — | — | Poor |
| | 9 | 0.01 or less | 32 | 3-1 | — | — | — | Fair |
| | 10 | 0.01 or less | — | 3-1 | 4-4 | 0.02 | — | Poor |
| | 11 | 0.01 or less | — | 3-1 | 4-5 | 68 | — | Fair |

The results shown in Table 1 revealed that Comparative Examples 1 to 11 are all inferior in terms of high film adhesion.

In particular, it was revealed that sufficiently high film adhesion is also not obtained in Comparative Example 9 in which the chemical conversion coating contains the phenolic resin.

In addition, it was revealed that sufficiently high film adhesion is also not obtained in Comparative Examples 10 and 11 in which the phenolic resin layer is formed but the carbon content is outside the scope of the invention.

In contrast, it was revealed that Examples 1 to 9 are all superior in terms of high film adhesion. It was revealed that Example 2 in which cleaning was performed after the phenolic resin layer was formed is superior in terms of high film adhesion to Example 1 in which cleaning was not performed.

The invention claimed is:

1. A method of manufacturing a steel sheet for containers, the steel sheet having a chemical conversion coating formed on the steel sheet and a phenolic resin layer formed on the chemical conversion coating, wherein the chemical conversion coating contains 1 to 100 mg/m$^2$ of zirconium metal and 0.1 to 50 mg/m$^2$ of phosphorus, wherein the phenolic resin layer contains 0.1 to 50 mg/m$^2$ of carbon, and wherein a fluorine content in the chemical conversion coating is from zero up to 0.1 mg/m$^2$, the method comprising:

forming the chemical conversion coating on the steel sheet by subjecting the steel sheet to electrolytic treatment using a treatment solution containing zirconium ions, phosphate ions, and fluorine ions;

after the forming step, cleaning the chemical conversion coating with hot water at 40° C. or more for at least 0.5 seconds, and immersing the steel sheet having the chemical conversion coating formed thereon in an aqueous solution containing a phenolic resin or applying an aqueous solution containing a phenolic resin onto the chemical conversion coating to form the phenolic resin layer; and thereafter, drying the steel sheet and then washing with water at a temperature of 80° C. or more to roughen a surface of the phenolic resin layer, and redrying.

2. The method according to claim 1, further comprising, before the forming step, forming a surface-treatment layer on at least one side of the steel sheet, the surface-treatment layer containing 10 to 1,000 mg/m$^2$ of nickel in terms of nickel metal amount or 100 to 15,000 mg/m$^2$ of tin in terms of tin metal amount.

3. The method according to claim 1, further comprising, before the forming step, plating a surface of the steel sheet with nickel or an iron-nickel alloy to form a nickel undercoat layer, wherein a tin-plating coating is then provided on the nickel undercoat layer, and part of the tin-plating coating is alloyed with part or all of the nickel undercoat layer by tin melting treatment to form a tin-plating layer containing tin islands, wherein the nickel undercoat layer contains 5 to 150 mg/m$^2$ of nickel in terms of nickel metal amount, and wherein the tin-plating layer contains 300 to 3,000 mg/m$^2$ of tin in terms of tin metal amount.

4. The method according to claim 1, wherein a temperature for the drying is 70° C. or more.

* * * * *